United States Patent
Brewer et al.

(10) Patent No.: US 6,535,996 B1
(45) Date of Patent: Mar. 18, 2003

(54) METHOD AND APPARATUS FOR PROTECTING USER DATA DURING POWER FAILURES IN A DATA PROCESSING SYSTEM

(75) Inventors: James Arthur Brewer, Leander, TX (US); Sanjay Gupta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,332

(22) Filed: Oct. 7, 1999

(51) Int. Cl.[7] .............................................. G06F 11/00
(52) U.S. Cl. ............................ 714/14; 714/22; 714/24
(58) Field of Search .............................. 714/14, 22, 24

(56) References Cited

U.S. PATENT DOCUMENTS

| | | | | |
|---|---|---|---|---|
| 5,396,637 A | * | 3/1995 | Harwell et al. ............. | 365/228 |
| 5,519,831 A | * | 5/1996 | Holzhammer ............... | 365/228 |
| 5,758,054 A | * | 5/1998 | Katz et al. .................. | 365/228 |
| 5,765,001 A | * | 6/1998 | Clark et al. ................. | 700/286 |
| 6,312,378 B1 | * | 11/2001 | Bardy ........................ | 600/300 |

OTHER PUBLICATIONS

Microsoft Press Computer Dictionary, 3rd Edition, 1997, Microsoft Press, p138.*

* cited by examiner

*Primary Examiner*—Scott Baderman
*Assistant Examiner*—Joshua Lohn
(74) *Attorney, Agent, or Firm*—Duke W. Yee; John D. Flynn; Michael R. Nichols

(57) ABSTRACT

A method and system for protecting user data during power failures on a network-computer-class data processing system is provided. The network-computer-class data processing system is integrated with a power supply having an early power fail warning signal to ensure that unsaved changes to user data files are saved before a complete power failure strikes the data processing system. As a user employs one or more applications to create or modify data files, a table of file changes is created for each user data file that is opened by the user. This table is kept in non-volatile media, preferably on the user's network computer but possibly on a server located on a network connected to the network computer if the network computer lacks non-volatile memory. The entire contents of the table are saved to non-volatile storage in the time interval between the early power fail warning signal going active and the power completely failing. The table of user data changes can then be applied to recreate the user's data after power is restored.

21 Claims, 4 Drawing Sheets

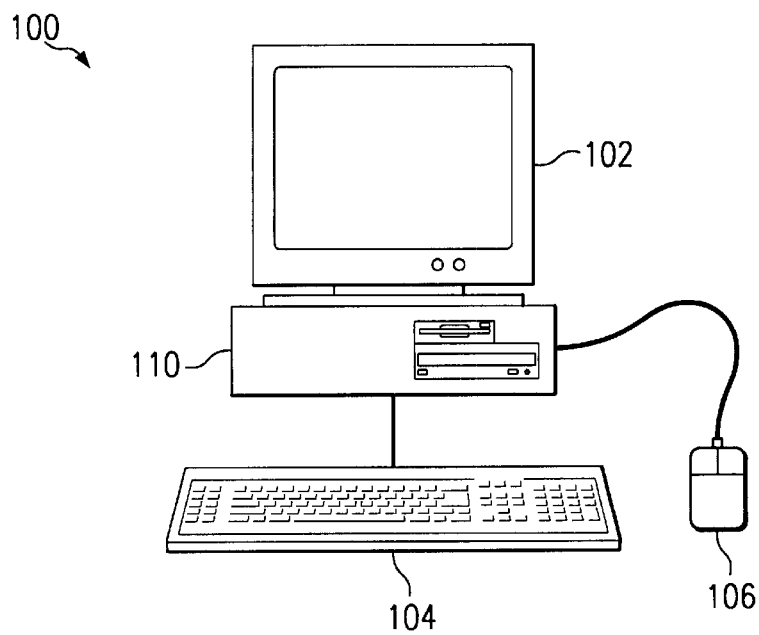
FIG. 1
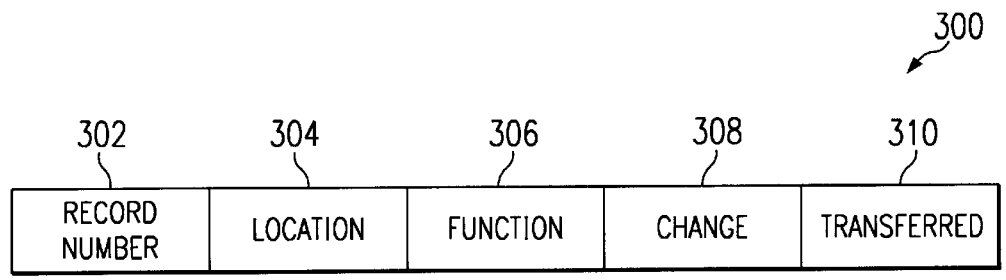
FIG. 3A
| RECORD NUMBER: | LOCATION: | FUNCTION: | CHANGE: | TRANSFERRED: |
|---|---|---|---|---|
| 000129 | 5525 | I | e | Y207 |
| 000130 | 5541 | D | | Y207 |
| 000131 | 5541 | I | t | N |
| 000132 | 5542 | I | s | N |
| 000133 | 5562 | O | p | N |
| 000134 | | S | | N |
| 000135 | | | | |
FIG. 3B

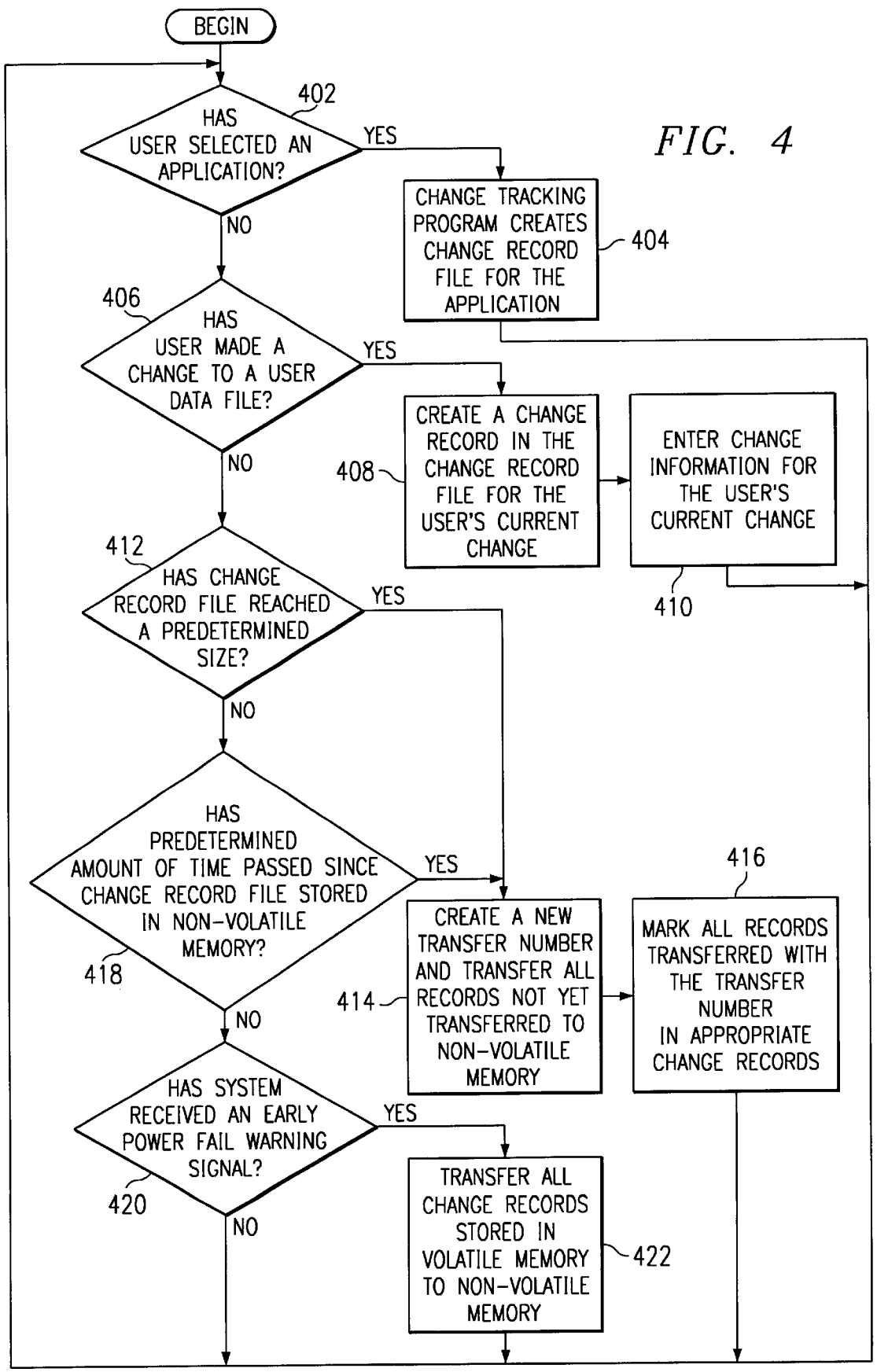

METHOD AND APPARATUS FOR PROTECTING USER DATA DURING POWER FAILURES IN A DATA PROCESSING SYSTEM

BACKGROUND OF THE INVENTION

1. Technical Field

The present invention relates generally to an improved data processing system and, in particular, to a method and system for computer power control and power sequencing.

2. Description of Related Art

In the early 1980s, as the first PC's were sold, people in the Information Systems (IS) industry thought that PC's might replace mainframe computers and cut operating costs drastically. Over the years, as personal computers gained more functionality and better user interfaces, end-users improved their productivity and ability to generate data. While enterprise data and legacy applications were still placed on the more reliable mainframe platforms, there was more and more need for distributed access to application and data resources.

The IS industry succeeded in connecting the two worlds of PC's and mainframes by implementing a client/server model with distributed databases. With the evolution of multi-platform applications over a variety of networking infrastructures, it appeared that PC's might replace mainframe computers. However, as people in the IS industry realized the immense overall costs of this approach, the client/server model evolved in many directions.

The choice of a wider variety of computer platforms improves the enterprise's ability to make appropriate investments in the evolving computing marketplace. Network Computers (NC's) offer versatility because they have a built-in capability to run emulation software and to provide access to Java™ and Windows™-based applications, such as browsers. NC's are typically implemented with only a general purpose processor, a system memory, and a communications port. Although other types of peripheral devices may be included, local drives, such as hard disk and floppy drives, are characteristically absent from such data processing systems. While the primary reason for not providing a local drive within such data processing systems is cost-saving, other reasons may include low-power requirement, reliability, and compactness. Therefore, NC's typically rely upon network access to provide dynamic, non-volatile data storage capability.

However, if the network computing environment is not managed properly, the administrative time and costs may be greater than those incurred in a traditional PC network. In addition, NC's are vulnerable to power failures during which all of a user's data will be lost because the data is usually temporarily stored in volatile memory in an NC.

Therefore, it would be useful to have a method and system for preserving user data in an NC when a power failure occurs.

SUMMARY OF THE INVENTION

A method and system for protecting user data during power failures on a network-computer-class data processing system is provided. The network-computer-class data processing system is integrated with a power supply having an early power fail warning signal to ensure that unsaved changes to user data files are saved before a complete power failure strikes the data processing system. As a user employs one or more applications to create or modify data files, a table of file changes is created for each user data file that is opened by the user. This table is kept in non-volatile media, preferably on the user's network computer but possibly on a server located on a network connected to the network computer if the network computer lacks non-volatile memory. The entire contents of the table are saved to non-volatile storage in the time interval between the early power fail warning signal going active and the power completely failing. The table of user data changes can then be applied to recreate the user's data after power is restored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention;

FIG. 3A is a diagram depicting a data structure for a record in a Change Record File that may be used to track changes to user data files in accordance with a preferred embodiment of the present invention;

FIG. 3B is a diagram depicting an example of a Change Record File containing exemplary changes to a user data file; and FIG. 4 is a flowchart depicting a process performed by a Change Tracking Program that uses a Change Record File to track changes by a user to a user data file to preserve user data in an NC during a power failure in accordance with the present invention.

DETAILED DESCRIPTION OF THE PREFERRED EMBODIMENT

Figure 2A:
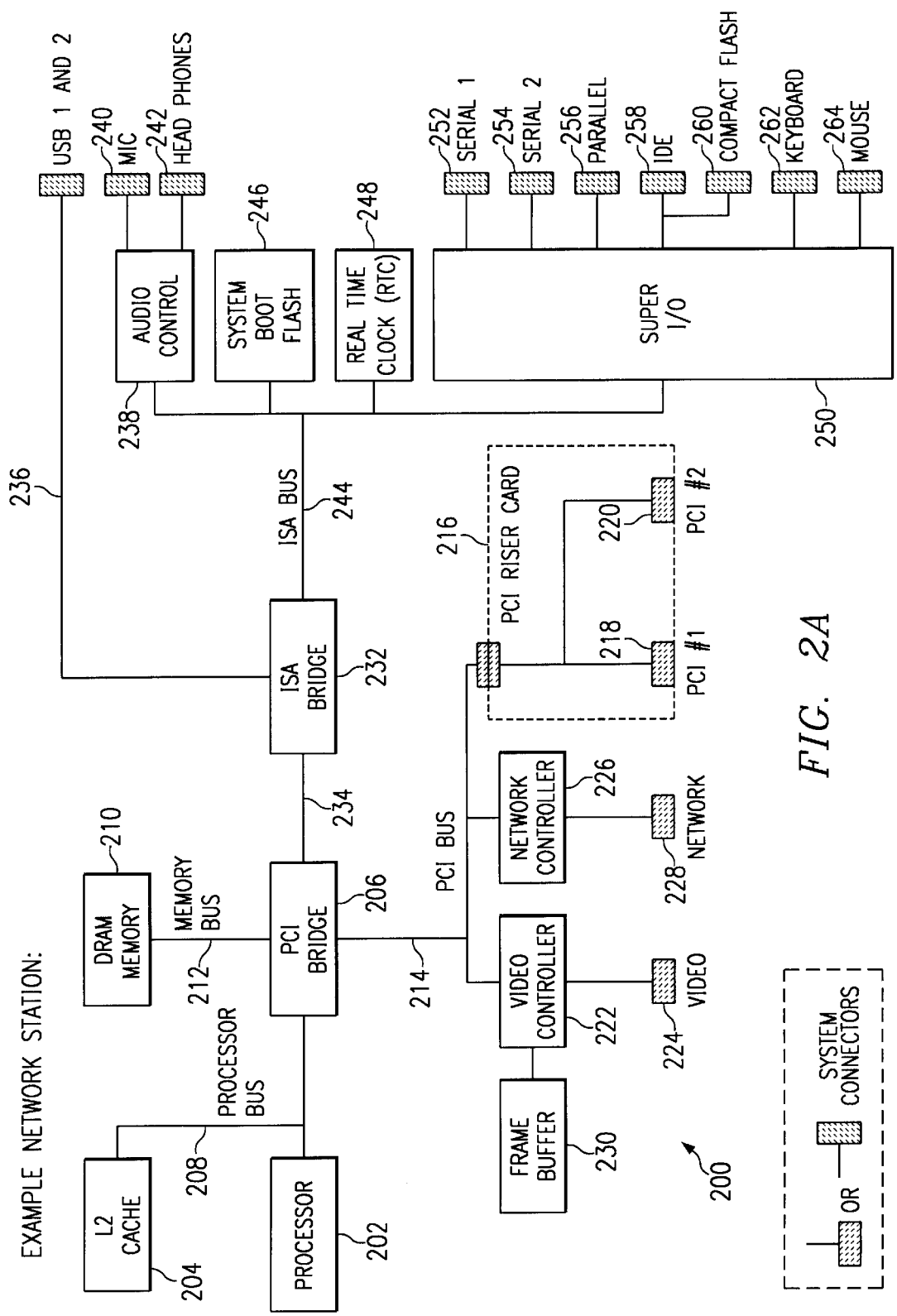
FIG. 2A is a block diagram depicting an organization of internal components in a data processing system that may implement the present invention.

With reference now to FIG. 1, a pictorial representation depicts a data processing system in which the present invention may be implemented in accordance with a preferred embodiment of the present invention. A computer 100 is depicted, which includes a system unit 110, a video display terminal 102, a keyboard 104, and mouse 106. Additional input devices may be included with computer 100. Computer 100 can be implemented using any suitable computer. Although the depicted representation shows a network computer (NC), other embodiments of the present invention may be implemented in other similar types of network-computer-class data processing systems, such as Web-based television set-top boxes, Internet appliances, personal digital assistants (PDAs), etc. Computer 100 also preferably includes a graphical user interface that may be implemented by means of system software residing in computer readable media in operation within computer 100.

FIG. 1 is intended as an example and not as an architectural limitation for the present invention.

With reference now to FIG. 2A, a block diagram depicts an organization of internal components in a data processing system that may implement the present invention. Data processing system 200 employs a variety of bus structures and protocols. Although the depicted example employs a PCI bus and an ISA bus, other bus architectures may be used. Processor 202 and L2 cache 204 are connected to PCI bridge 206 via processor bus 208. DRAM memory 210 connects to PCI bridge 206 via memory bus 212. PCI bridge 206 connects to PCI bus 214 that provides interconnections to other PCI buses and media devices. For example, PCI bus 214 connects to PCI riser card 216 that allows the interconnection of other PCI buses, such as interconnect 218 and interconnect 220. PCI bus 214 provides connections for external data streams through network controller 226 and network interconnect 228. Video controller 222 accepts video datastreams from PCI bus 214 and temporarily stores video frames in frame buffer 230 before feeding the video datastream to a monitor via video interconnect 224.

ISA bridge 232 connects to PCI bridge 206 via interconnect 234. ISA bridge 232 provides interconnection capabilities to a variety of input/output devices. Universal serial bus (USB) 236 provides interconnection capability to common personal electronic devices, such as digital cameras, video disk players, etc., that employ the well known USB standard. Audio controller 238 provides microphone connection 240 and headphone connection 242. Data processing system 200 uses ISA bus 244 to access system boot flash memory 246 in which system boot code may be stored. Real-time clock (RTC) 248 provides timing information to data processing system 200. Super I/O interconnect 250 provides interconnection capability to a number of computer peripheral devices and routes the data to and from these devices to data processing system 200 via ISA bus 244. Serial ports 252–254 provide interconnection capability to devices with serial ports. Parallel port 256 provides interconnection capability to devices that also contain a parallel port. Integrated device electronics (IDE) connection 258 provides an interface to controller electronics that may reside on a disk drive. Compact flash port 260 provides an interface to flash memory cards that are commonly used with small electronic devices and laptop computers and may include such cards as PCMCIA cards. Keyboard connection 262 and mouse connection 264 allow data processing system 200 to accept input data from a user.

Figure 2B:
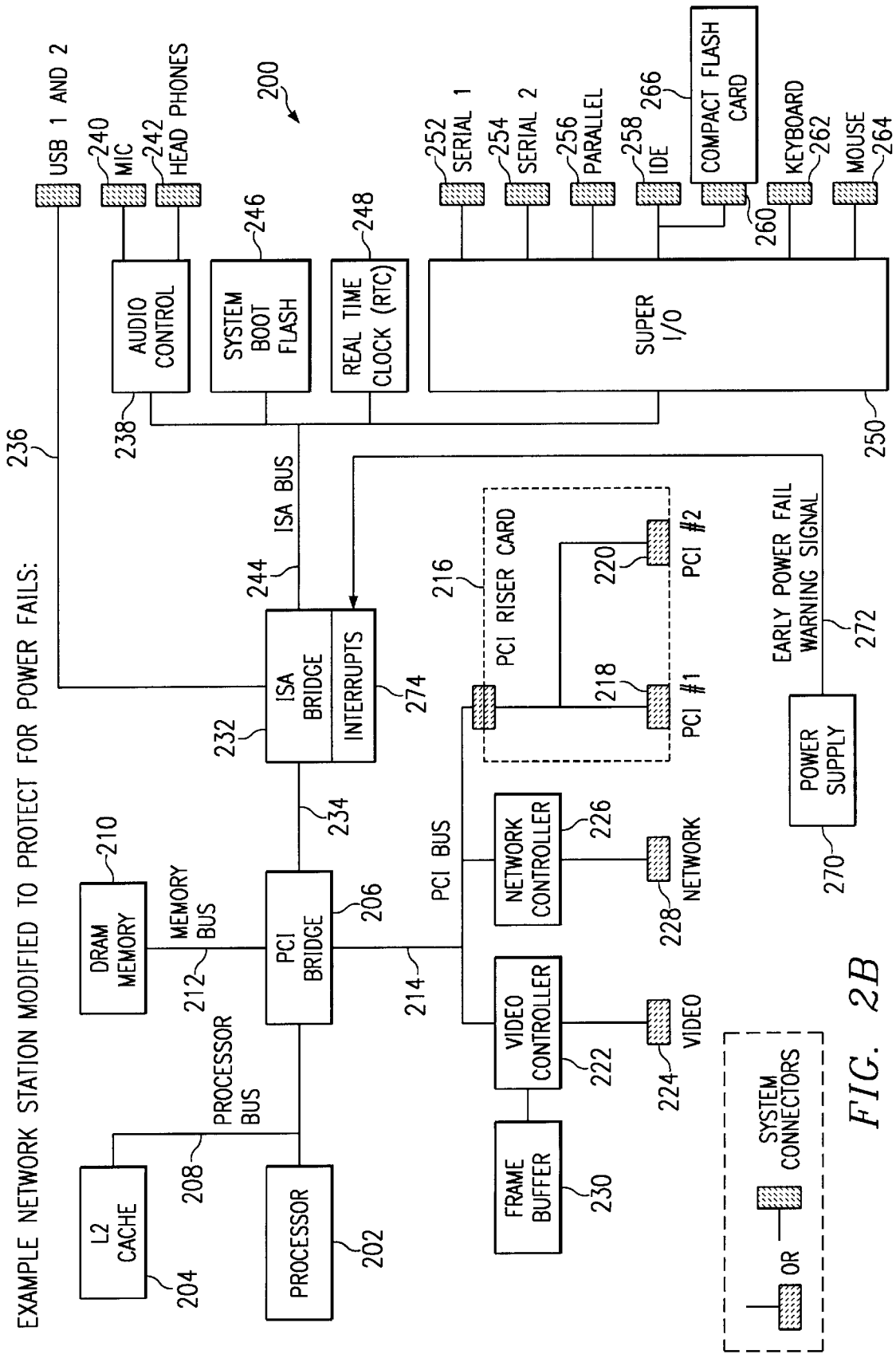
FIG. 2B is a block diagram depicting an organization of internal components in a data processing system that includes the ability to preserve user data in an NC during a power failure in accordance with the present invention.

With reference now to FIG. 2B, a block diagram depicts an organization of internal components in a data processing system that includes the ability to preserve user data in an NC during a power failure in accordance with the present invention. Similar elements in FIG. 2A and FIG. 2B are labeled similarly. In addition to the connections and components shown in system 200 in FIG. 2A, FIG. 2B includes compact FLASH card 266 that contains flash memory that connects to compact flash port 260 to provide system 200 with non-volatile storage. Compact FLASH card 266 may be in a PC Card form that may be plugged into a PCMCIA slot. Flash memory is generally used as a supplement or replacement for other forms of non-volatile memory, such as hard disks.

FIG. 2B also includes power supply 270 that provides electricity in the appropriate manner to data processing system 200 as required by the configuration of the system, e.g., AC-DC converter for a desktop system or battery for a portable device. Power supply 270 provides early power fail warning signal 272 to interrupt controller 274 of ISA bridge 232. Early power fail warning signal 272 is sent to processor 202 as a non-maskable interrupt. The functionality of supplying an early power fail warning signal is integrated in many commercially available power supplies. When a power supply detects that the quality of the power signal has dropped below a configurable, unacceptable level, or has otherwise failed to maintain a particular quality or condition, the power supply can generate the early power fail warning signal, and the power supply then ensures that a predetermined period of time passes before the power supply actually becomes unusable.

The present invention integrates a data processing system with this type of power supply and uses its early power fail warning signal as an unmaskable interrupt to ensure that unsaved changes to user data files are saved before a complete power failure strikes the data processing system. Alternatively, the data processing system is a portable device or network station that contains non-volatile storage, whether or not it is connected to a network containing a server. In either case, the data processing system may be termed a "network station" or a "network-computer-class system"—in other words, a network-computer-class system is in a class of computers with these configuration characteristics.

As a user employs one or more applications to create or modify data files, the present invention creates a table of file changes for each user data file that is opened by the user. This table is kept in non-volatile media, preferably on the user's network computer but possibly on a server located on a network connected to the network computer if the network computer lacks non-volatile memory. For efficiency, the table of user data file changes may be kept in system memory as long as it is possible to save the entire contents of the table to non-volatile storage in the time interval between the early power fail warning signal going active and the power completely failing. Once the power is restored, any changes made to the user data files prior to the power failure are recreated, and the user may be given the option to save these changes over the original file or files.

With reference now to FIG. 3A, a diagram depicts a data structure for a record in a Change Record File that may be used to track changes to user data files in accordance with a preferred embodiment of the present invention. Change Record 300 is a record that is created by a change tracking program for each change in each data file opened by a user. Change Record 300 contains Record Number field 302, Location field 304, Function field 306, Change field 308, and Xfered field 310. Record Number field 302 is a running count of the change number which has been made by the user during a current session in which the user is modifying the user data file or files. Location field 304 is the location within the file where the change is being made or has been made.

Function field 306 is an indicator of the type of function which is to be performed or has been performed for the change initiated by the user. Possible indicator values include: "I": Insert active, for which a specified character is being written to the user data file; "D": Delete active, for which the specified character is being deleted; "O": Overwrite active, for which a character is being overwritten by a specified character; "F": File command, in which the original file is modified as indicated in the Change Record File and then the Change Record File is erased; "S": Save command, in which the original file is modified as indicated in the Change Record File and then all entries in the Change Record File are cleared; "Q": Quit command, in which no modifications are made to the original file and then the Change Record File is erased. The number of functions and the meaning of the Function indicators may vary depending upon system implementation.

Change field 308 is the actual keystroke entry for the change being made by the user. Xfered field 310 is used only for those data processing systems that do not possess non-volatile storage and is an indicator that the change record has been transferred to a server so that the mirror image of the user data file may be updated. Records are removed from the Change Record File after they are sent to the server, the server has updated the mirror image of the user data file, and an acknowledgment has been returned to the client. A transfer number is attached to the indicator in the Xfered field so that the appropriate records may be cleared upon an acknowledgment response from the server that informs the client that the change records have been transferred to the server's non-volatile storage.

Although Change Record 300 tracks a change in the form of keystrokes or individual characters, the form of the data item in the user data file to be changed or the form of the data item change in Change field 308 may vary depending upon system implementation. For example, if the user application stores and retrieves numerical values as data items, as may occur in an accounting program, then Change Record 300 would track the numerical values.

With reference now to FIG. 3B, a diagram depicts an example of a Change Record File containing exemplary changes to a user data file. Change Record File 350 is a record that is created by a change tracking program for each data file opened by a user. Changes made to the selected user data file by the user are captured in sequence in the Change Record File.

Change record file 350 contains a series of records 351–357, preferably in the order in which the change was made by the user. As shown by the indicators in the Xfered fields, change records 351–352 have been transferred to a server.

A Change Record File may be stored on a network-computer-class client in non-volatile memory, e.g., in a FLASH memory card or in a hard file if available. If neither of these non-volatile storage devices exist in the network station, then the Change Record File is held within system memory on the client and transferred to a server at periodic intervals. In that case, the Change Record File would probably be relatively small to force frequent transferals and to ensure the reduction of the potential loss of the user data.

It is important that the changes to the user data files are captured into non-volatile storage, which may be on either the network station or on the server. The changes are eventually transferred over the network to the server to update the original file, but if non-volatile storage exists on the network station, client, or network-computer-class data processing system, then more changes may be buffered for eventual transfer to a server. If non-volatile storage does not exist on the network-computer-class data processing system, then the Change Record File may be placed into volatile system memory and transferred frequently to a network server.

During the time interval in which the early power fail warning signal is active, the Change Tracking Program ensures that all changes which reside in volatile memory are moved into non-volatile storage, either on the client or on the server. The amount of time which is provided by the early power fail warning signal will determine the number of change records that may be held within the system memory of the network station. In this manner, a specific period of time is guaranteed after the early power fail warning signal and an actual power fail during which all change records may be permanently recorded.

With reference now to FIG. 4, a flowchart depicts a process performed by a Change Tracking Program that uses a Change Record File to track changes by a user to a user data file to preserve user data in an NC during a power failure in accordance with the present invention. The Change Tracking Program is loaded in the client after the operating system has been initialized but prior to the user selecting any applications.

As part of its initialization, the Change Tracking Program may analyze the configuration of the client on which it is executing to determine its behavior. If the client contains non-volatile memory, then the Change Tracking Program may reserve or otherwise initialize a portion of the non-volatile memory for data structures related to its maintenance of Change Record Files. If the client does not contain non-volatile memory, then the Change Tracking Program may select an appropriate network server for storing the Change Record File.

A portion of the Change Tracking Program may operate on a server if no non-volatile memory exists on the network station. The Change Tracking Program may operate as a daemon in a manner such that the Change Tracking Program executes an essentially non-terminating loop.

The process begins with a determination of whether the user has selected an application to begin creating or modifying a user data file (step 402). If so, then the Change Tracking creates a Change Record File to be used with the application (step 404), and the process continues looping. If non-volatile storage exists on the client or network-computer-class computer on which the Change Tracking Program is executing, then the Change Record File is created on the client.

If an application has not been selected by the user, then a determination is made as to whether the user has changed or requested a change to a user data file (step 406), e.g., by editing the file. If so, then a new Change Record is created within the Change Record File (step 408), and information concerning the change is entered into the new Change Record (step 410), after which the process loops. The manner in which the Change Tracking Program detects a user change to the user data file may vary depending upon the system implementation. When a user data file is first loaded by the operating system into system memory, the Change Tracking Program may intercept an address range at which the user data file is placed into client memory. The Change Tracking Program would then snoop memory transactions to detect transactions of interest by capturing write commands from the operating system kernel going to system memory where the user's data is stored.

If the user has not made a change to the user data file, a determination is made as to whether the Change Record File has reached a predetermined size, i.e. whether a predetermined number of Change Records have accumulated (step 412). If so, then a new transfer number is generated for tracking the transfer operations, and all of the untransferred Change Records are transferred to non-volatile storage (step 414). All transferred Change Records are then marked with the transfer number (step 416). Alternatively, the Change Records could be deleted after they have been transferred to non-volatile memory.

If the Change Records are being transferred to a server because there is no non-volatile storage on the client, then an acknowledgment should be received by the client from the server after the server has stored the Change Records, and in response, the client may clear all the Change Records containing the transfer number returned in the acknowledgment from the server.

The server-side of the Change Tracking Program accepts the change data transferred from the client and updates the original file or mirror image of the original file as required. The server-side also tracks the last record number which has been used to modify the original file so that a user or program can determine at a later time whether some of the change data was lost due to power failure.

If the Change Record File has not reached a predetermined size, then a determination is made as to whether a predetermined amount of time has elapsed since the Change Record File was transferred to non-volatile memory (step 418). If so, then the Change Record File is transferred according to the steps described above with respect to step 414 and step 416, and the process loops.

If the Change Record File does not need to be transferred to non-volatile memory, then a determination is made as to whether an early power fail warning signal has been received (step 420). If so, then all Change Records stored in volatile memory are immediately transferred to non-volatile storage (step 422), and the process loops. It is to be understood that the early power fail warning signal causes an interrupt received by the operating system, which then invokes a routine within the Change Tracking Program to field the interrupt and allow the Change Tracking Program to perform its data saving functions. The Change Tracking Program may be only one of multiple programs that are notified of this interrupt so as to perform warm shutdown functions. Alternatively, the data saving functionality of the Change Tracking Program may be invoked in a different manner depending upon the system hardware and software configuration.

The advantages of the present invention should be apparent with reference to the detailed description provided above. The user boots and uses the network-computer-class data processing system in the same manner as though the network computer were not configured with the present invention. Upon a power failure, the data processing system becomes unusable until power is restored, whether or not the protective features are present. In previous computer systems, when a system regains power after a power failure, the user will have lost all changed data beyond the last save, whether manually saved by the user or automatically saved by an application, and the user cannot recover the modified data. The typical solution has been that the user must be aware of the danger of periodic power failures so that the user manually saves data periodically. However, even if these actions are performed, all of the user's changes since the last save could be lost with a power failure. It is often more likely that a user would become engrossed in the change activity on which he or she is working and forget to perform periodic saves, which would put some of the user data at risk of loss during a power outage.

With the present invention, the user's data is automatically protected without direct, manual, or explicit commands to save the data. When a system regains power after a power failure, the user may be informed of the unsaved changes to a user data file. The user may then have the option of reading and/or saving the file containing the changes which had not previously been saved prior to the power outage, and the user may have the option of applying the saved changes to the user data file. If the user had multiple open files containing changes which had not been saved when the power was lost, then multiple change record files or multiple changed images of original user data files may be available after restoration of power and system reboot.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of preserving data integrity during periods of unstable power supply in a data processing system, the method comprising the computer-implemented steps of:
    tracking changes made by a user to data files;
    receiving an early power fail warning signal, wherein the early power fail warning signal provides an indication that a power supply in the data processing system has become unstable;
    in response to the early power fail warning signal, storing the tracked changes in non-volatile memory;
    creating a change record file for a data file modified by a user; and
    generating a change record in the change record file for each change to the data file.

2. The method of claim 1 wherein the non-volatile memory is flash or hardfile memory in the data processing system.

3. The method of claim 1 wherein the non-volatile memory is permanent storage in a server on a network connected to the data processing system.

4. The method of claim 1 further comprising:
    providing the early power fail warning signal in response to a determination that the power supply has dropped below a configurable level.

5. The method of claim 1 wherein the step of storing the tracked changes in non-volatile memory is completed within a predetermined period of time.

6. The method of claim 1 wherein a plurality of change record files are created for each data file modified by a user.

7. The method of claim 1 further comprising:
    storing the change record file in non-volatile memory in response to a number of change records in the change record file equaling a predetermined value.

8. The method of claim 1 further comprising:
    storing the change record file in non-volatile memory at predetermined time intervals.

9. The method of claim 1, wherein the tracked changes are stored using power from the power supply.

10. An apparatus for preserving data integrity during periods of unstable power supply in a data processing system, the apparatus comprising:
    tracking means for tracking changes made by a user to data files;
    receiving means for receiving an early power fail warning signal, wherein the early power fail warning signal provides an indication that a power supply in the data processing system has become unstable;

first storming means for storing, in response to the early power fail warning signal, the tracked changes in non-volatile memory;

creating means for creating a change record file for a data file modified by a user; and generating means for generating a change record in the change record file for each change to the data file.

11. The apparatus of claim 10 wherein the non-volatile memory is flash or hardfile memory in the data processing system.

12. The apparatus of claim 10 wherein the non-volatile memory is permanent storage in a server on a network connected to the data processing system.

13. The apparatus of claim 10 further comprising:

providing means for providing the early power fail warning signal in response to a determination that the power supply has dropped below a configurable level.

14. The apparatus of claim 10 wherein the first storing means operates within a predetermined period of time.

15. The apparatus of claim 10 wherein a plurality of change record files arc created for each data file modified by a user.

16. The apparatus of claim 10 further comprising:

second storing means for storing the change record file in non-volatile memory in response to a number or change records in the change record file equaling a predetermined value.

17. The apparatus of claim 10 further comprising:

third storing means for storing the change record file in non-volatile memory at predetermined time intervals.

18. A computer program product in a computer-readable medium for use in a data processing system for preserving data integrity during periods of unstable power supply in the data processing system, the computer program product comprising:

first instructions for tracking changes made by a user to data files;

second instructions for receiving an early power fail warning signal, wherein the early power fail warning signal provides an indication that a power supply in the data processing system has become unstable;

third instructions for storing, in response to the early power fail warning signal, the tracked changes in non-volatile memory;

instructions for creating a change record file for a data file modified by a user; and instructions for generating a change record in the change record file for each change to the data file.

19. The computer program product of claim 18 further comprising:

instructions for providing the early power fail warning signal in response to a determination that the power supply has dropped below a configurable level.

20. The computer program product of claim 18 further comprising:

instructions for storing the change record file in non-volatile memory in response to a number of change records in the change record file equaling a predetermined value.

21. The computer program product of claim 18 further comprising:

instructions for storing the change record file in non-volatile memory at predetermined time intervals.

* * * * *